US011955693B2

(12) United States Patent
Choi et al.

(10) Patent No.: US 11,955,693 B2
(45) Date of Patent: Apr. 9, 2024

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Na Yeon Kim, Seoul (KR); Han Sub Ryu, Gyeongsangbuk-do (KR); Dong Pil Park, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 135 days.

(21) Appl. No.: 17/569,772

(22) Filed: Jan. 6, 2022

(65) Prior Publication Data

US 2022/0216587 A1 Jul. 7, 2022

(30) Foreign Application Priority Data

Jan. 7, 2021 (KR) ........................ 10-2021-0002106

(51) Int. Cl.

*H01Q 1/22* (2006.01)
*H01Q 1/38* (2006.01)
*H01Q 1/44* (2006.01)

(52) U.S. Cl.

CPC ............. *H01Q 1/2283* (2013.01); *H01Q 1/38* (2013.01); *H01Q 1/44* (2013.01)

(58) Field of Classification Search

CPC ........... H01Q 1/2283; H01Q 1/38; H01Q 1/44
See application file for complete search history.

(56) References Cited

U.S. PATENT DOCUMENTS

2013/0207879 A1* 8/2013 Rada ........................ H01Q 1/38 343/893
2014/0106684 A1* 4/2014 Burns ...................... H01Q 1/24 455/78
2017/0358847 A1* 12/2017 Cho ....................... H01Q 1/243
2019/0319341 A1* 10/2019 Park ....................... H01Q 1/243
2020/0153114 A1* 5/2020 Wada ....................... H01Q 1/38
2020/0393936 A1* 12/2020 Bok ......................... H01Q 1/38
2020/0403307 A1* 12/2020 Ahmadloo ............... H01Q 1/38
2021/0234259 A1* 7/2021 Son .......................... H01Q 1/38

FOREIGN PATENT DOCUMENTS

KR 10-2003-0095557 A 12/2003

* cited by examiner

*Primary Examiner* — Hoang V Nguyen
*Assistant Examiner* — Aladdin Abdulbaki
(74) *Attorney, Agent, or Firm* — The PL Law Group, PLLC

(57) ABSTRACT

An antenna package according to an embodiment of the present disclosure includes a first antenna device including a first antenna unit, a first circuit board electrically connected to the first antenna unit, a second circuit board electrically connected to the first circuit board, a second antenna unit integrated with the second circuit board, and an antenna driving integrated circuit chip mounted on the second circuit board and electrically connected to the first antenna unit and the second antenna unit. Multi-axial radiation is implemented using the antenna package with high efficiency and reliability.

14 Claims, 5 Drawing Sheets

ANTENNA PACKAGE AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2021-0002106 filed on Jan. 7, 2021 in the Korean Intellectual Property Office (KIPO), the entire disclosures of which are incorporated by reference herein.

BACKGROUND

1. Field

The present invention relates to an antenna package and an image display device including the same. More particularly, the present invention relates to an antenna package including an antenna device and a circuit board and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to developments of a mobile communication technology, an antenna capable of implementing, e.g., high frequency or ultra-high frequency band communication is needed in the display device.

However, if a driving frequency of the antenna increases, a receiving coverage may be relatively decreased and a sufficient band width may not be easily obtained. Further, a signal loss may be caused by a structure and an environment around the antenna to result in a degradation of an antenna sensitivity and reliability.

Further, as the image display device becomes thinner and a display area increases, a space for accommodating the antenna may be decreased. Thus, a construction of an antenna capable of implementing sufficient coverage and gain, and high-frequency driving within a limited space may be needed.

For example, Korean Published Patent Application No. 2003-0095557 discloses an antenna embedded in a mobile terminal, which may not provide sufficient coverage in a limited space.

SUMMARY

According to an aspect of the present invention, there is provided an antenna package having improved operational reliability and structural efficiency.

According to an aspect of the present invention, there is provided an image display device including an antenna package with improved operational reliability and structural efficiency.

(1) An antenna package, including: a first antenna device including a first antenna unit; a first circuit board electrically connected to the first antenna unit; a second circuit board electrically connected to the first circuit board; a second antenna unit integrated with the second circuit board; and an antenna driving integrated circuit chip mounted on the second circuit board and electrically connected to the first antenna unit and the second antenna unit.

(2) The antenna package of the above (1), wherein the first antenna unit and the second antenna unit are electrically connected to a single number of the antenna driving integrated circuit chip.

(3) The antenna package of the above (1), further including: a first connector mounted on the first circuit board and electrically connected to the first antenna unit; and a second connector mounted on the second circuit board and coupled to the first connector.

(4) The antenna package of the above (3), wherein the second circuit board further includes a first connection wiring, and the second connector is electrically connected to the antenna driving integrated circuit chip through the first connection wiring.

(5) The antenna package of the above (3), wherein the first connector and the second connector are high-frequency connectors.

(6) The antenna package of the above (1), wherein the second circuit board includes a second core layer and a first via structure penetrating the second core layer, and the second antenna unit is disposed on a bottom surface of the second core layer and is electrically connected to the antenna driving integrated circuit chip through the first via structure.

(7) The antenna package of the above (6), further including: a third antenna unit disposed under the second antenna unit; and an insulating layer disposed between the second antenna unit and the third antenna unit.

(8) The antenna package of the above (7), wherein the second circuit board includes a second via structure penetrating the second core layer and the insulating layer, and the third antenna unit is electrically connected to the antenna driving integrated circuit chip through the second via structure.

(9) The antenna package of the above (1), wherein the first circuit board is a flexible printed circuit board (FPCB) and the second circuit board is a rigid printed circuit board.

(10) The antenna package of the above (1), wherein the first antenna unit includes a plurality of first antenna units disposed in an array form, and the first circuit board includes a plurality of signal wirings independently bonded to each of the plurality of first antenna units and electrically connected to the first connector.

(11) The antenna package of the above (10), wherein the first circuit board has a first portion bonded to the first antenna unit and a second portion having a smaller width than that of the first portion, and the first connector is mounted on the second portion.

(12) The antenna package of the above (11), wherein the second portion of the first circuit board is bent to couple the first connector and the second connector to each other.

(13) The antenna package of the above (10), wherein the first antenna device further includes an antenna dielectric layer on which the first antenna units are arranged, and each of the first antenna units includes a first radiator, a transmission line extending from the radiator and a signal pad connected to a terminal end portion of the transmission line and bonded to each of the signal wirings.

(14) An image display device, including: a display panel; and the antenna package according embodiments as described above disposed on the display panel such that the first antenna unit is disposed at a front portion of the display panel.

(15) The image display device of the above (14), further including a main board disposed under the display panel, and a control unit mounted on the main board, and the antenna package is bent under the display panel to be electrically connected to the control unit.

(16) The image display device of the above (15), wherein the second circuit board of the antenna package includes a second connection wiring, and the antenna package further includes a third connector mounted on the second circuit board and electrically connected to the antenna driving integrated circuit chip through the second connection wiring.

(17) The image display device of the above (16), further including a fourth connector mounted on the main board to be coupled to the third connector, wherein the main board further includes a third connection wiring for electrically connecting the control unit and the fourth connector to each other.

(18) The image display device of the above (17), wherein the third connector and the fourth connector are low-frequency connectors.

The antenna package according to embodiments of the present invention may include a first circuit board bonded to a first antenna device, a second circuit board electrically connected to the first circuit board and including an antenna driving integrated circuit chip mounted thereon, and a second antenna unit integral with the second circuit board. Accordingly, a plurality of antenna units may be connected to one antenna driving integrated circuit chip, and a multi-axial transmission/reception and an extended beam coverage may be achieved.

In some embodiments, the second antenna unit may be electrically connected to the antenna driving integrated circuit chip through a via structure. In this case, a connection distance between the second antenna unit and the antenna driving IC chip may be decreased. Accordingly, a signal loss of the antenna may be reduced and radiation performance may be improved.

In some embodiments, a connector connecting the first circuit board and the second circuit board may be a high-frequency connector, and a connector connecting the second circuit board and a main board of the image display device may be a low-frequency connector. Accordingly, a high frequency or ultra-high frequency signal may be converted into a low frequency signal in the antenna driving integrated circuit chip to be stably transmitted to a control unit of the main board.

In some embodiments, the first antenna unit may serve as an AoD (Antenna on Display) disposed on a front portion of a display panel in an image display device, and the second antenna unit may serve as an AiP (Antenna in package) included in a lateral or rear portion of the image display device. Signal transmission/reception and radiation may be implemented throughout a substantially entire area of the image display device using the antenna package. Further, the AoD and the AiP may be independently controlled and driven through the same antenna driving integrated circuit (IC) chip.

DETAILED DESCRIPTION OF THE EMBODIMENTS

According to exemplary embodiments of the present invention, there is provided an antenna package including antenna units and a circuit board. According to exemplary embodiments of the present invention, there is also provided an image display device including the antenna package.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms “first”, “second”, “top”, “bottom”, “above”, “bottom”, etc., used in this application are not intended to designate an absolute position, but are used to distinguish different components, or designate relative positions between different components.

Figure 1:
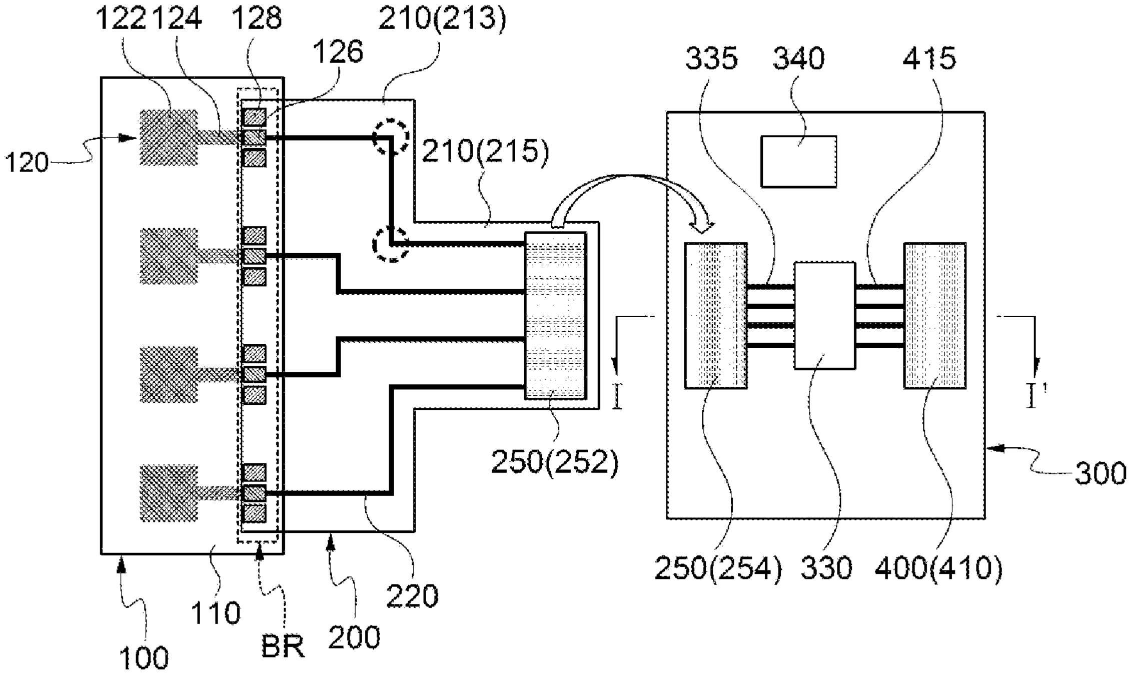
FIG. 1 is a schematic top planar view illustrating an antenna package in accordance with exemplary embodiments.

FIG. 1 is a schematic top planar view illustrating an antenna package in accordance with exemplary embodiments.

Referring to FIG. 1, the antenna package may include a first antenna device 100, a first circuit board 200, and connectors 250 and 400. The antenna package may further include a second circuit board 300 connected to the first circuit board 200 through a circuit board coupling connector 250.

The first antenna device 100 may include an antenna dielectric layer 110 and an antenna unit 120 disposed on the antenna dielectric layer 110.

The antenna dielectric layer 110 may include a transparent resin film that may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

The antenna dielectric layer 110 may include an adhesive material such as an optically clear adhesive (OCA) or an optically clear resin (OCR). In some embodiments, the antenna dielectric layer 110 may include an inorganic insulating material such as silicon oxide, silicon nitride, silicon oxynitride, glass, or the like.

In some embodiments, a dielectric constant of the antenna dielectric layer 110 may be adjusted in a range from about 1.5 to about 12. When the dielectric constant exceeds about 12, a driving frequency may be excessively decreased, so that driving in a desired high or ultra-high frequency band may not be implemented.

The first antenna unit 120 may be formed on a top surface of the antenna dielectric layer 110. For example, a plurality of the antenna units 120 may be arranged in an array form along a width direction of the antenna dielectric layer 110 or the antenna package to form an antenna unit row.

The first antenna unit 120 may include a first radiator 122 and a transmission line 124. The first radiator 122 may have, e.g., a polygonal plate shape, and the transmission line 124 may extend from one side of the first radiator 122. The transmission line 124 may be formed as a single member substantially integral with the first radiator 122, and may have a smaller width than that of the first radiator 122.

The first antenna unit 120 may further include a signal pad 126. The signal pad 126 may be connected to an end portion of the transmission line 124. In an embodiment, the signal pad 126 may be provided as a member substantially integral with the transmission line 124, and the end portion of the transmission line 124 may serve as the signal pad 126.

In some embodiments, a ground pad 128 may be disposed around the signal pad 126. For example, a pair of the ground pads 128 may be disposed to face each other with the signal pad 126 interposed therebetween. The ground pad 128 may be electrically and physically separated from the transmission line 124 and the signal pad 126.

The first antenna unit 120 or the first radiator 122 may be designed to have, e.g., a resonance frequency of higher high-frequency or ultra-high frequency band corresponding to a band of 3G, 4G, 5G or higher. For example, the resonance frequency of the antenna unit may be in a range from about 20 GHz to 40 GHz.

In some embodiments, the first radiators 122 having different sizes may be arranged on the antenna dielectric layer 110. In this case, the first antenna device 100 may be provided as a multi-radiation or multi-band antenna radiating in a plurality of resonance frequency bands.

The first antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the first antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In an embodiment, the first antenna unit 120 may include a transparent conductive oxide such as indium tin oxide (ITO), indium zinc oxide (IZO), zinc oxide (ZnOx), indium zinc tin oxide (IZTO), etc.

In some embodiments, the first antenna unit 120 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The first antenna unit 120 may include a blackened portion, so that a reflectance at a surface of the first antenna unit 120 may be decreased to suppress a visual recognition of the antenna unit due to a light reflectance.

In an embodiment, a surface of the metal layer included in the first antenna unit 120 may be converted into a metal oxide or a metal sulfide to form a blackened layer. In an embodiment, a blackened layer such as a black material coating layer or a plating layer may be formed on the first antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the first radiator 122 and the transmission line 124 may include a mesh-pattern structure to improve transmittance. In this case, a dummy mesh pattern (not illustrated) may be formed around the first radiator 122 and the transmission line 124.

The signal pad 126 and the ground pad 128 may be formed in a solid pattern formed of the above-described metal or alloy in consideration of a reduction of a feeding resistance, a noise absorption efficiency, an addition of a horizontal radiation property.

In an embodiment, the first radiator 122 may have a mesh-pattern structure, and at least a portion of the transmission line 124 may include a solid metal pattern.

The first radiator 122 may be disposed in a display area of an image display device, and the signal pad 126 and the ground pad 128 may be disposed in a non-display area or a bezel area of the image display device. At least a portion of the transmission line 124 may also be disposed in the non-display area or the bezel area.

The first circuit board 200 may include a first core layer 210 and a signal wiring 220 formed on a surface of the first core layer 210. For example, the first circuit board 200 may be a flexible printed circuit board (FPCB).

In some embodiments, the antenna dielectric layer 110 may serve as the first circuit board 200. In this case, the first circuit board 200 (e.g., the first core layer 210 of the first circuit board 200) may be provided as a member substantially integral with the antenna dielectric layer 110. Further, the signal wiring 220 may be directly connected to the transmission line 124, and the signal pad 126 may be omitted.

The first core layer 210 may include, e.g., a flexible resin such as a polyimide resin, modified polyimide (MPI), an epoxy resin, polyester, a cycloolefin polymer (COP) or a liquid crystal polymer (LCP). The first core layer 210 may include an internal insulating layer included in the first circuit board 200.

The signal wirings 220 may serve as, e.g., feeding lines. The signal wirings 220 may be arranged on one surface of the first core layer 210 (e.g., a surface facing the antenna unit 120).

For example, the first circuit board 200 may further include a coverlay film formed on the one surface of the first core layer 210 and covering the signal wirings 220.

The signal wirings 220 may be connected or bonded to the signal pads 126 of the first antenna units 120. For example, one end portions of the signal wirings 220 may be exposed by partially removing the coverlay film of the first circuit board 200. The exposed end portions of the signal wirings 220 may be bonded to the signal pads 126.

For example, a conductive bonding structure such as an anisotropic conductive film (ACF) may be attached on the signal pads 126, and then a bonding region BR of the first circuit board 200 in which the one end portions the signal wirings 220 are positioned may be disposed on the conductive bonding structure. Thereafter, the bonding region BR of the first circuit board 200 may be attached to the first antenna device 100 by a heat treating/pressing process, and the signal wirings 220 may be electrically connected to each signal pad 126.

As illustrated in FIG. 1, each of the signal wiring 220 may be independently connected or bonded to each of the signal pads 126 of the first antenna units 120. In this case, feeding and control signals may be independently supplied from an antenna driving integrated circuit (IC) chip 330 to each of the first antenna units 120.

In some embodiments, the predetermined number of the antenna units 120 may be coupled through the signal wiring 220.

In some embodiments, the first circuit board 200 or the first core layer 210 may include a first portion 213 and a second portion 215 having different widths, and the second portion 215 may have a width smaller than that of the first portion 213.

The first portion 213 may serve as, e.g., a main substrate portion of the first circuit board 200. One end portion of the first portion 213 may include the bonding region BR, and the signal wirings 210 may extend from the bonding region BR toward the second portion 215 on the first portion 213.

The signal wirings 210 may include a bent portion on the first portion 213 as indicated by a dotted circle. Accordingly, the signal wirings 210 may extend on the second portion 215 having a relatively narrow width with a smaller spacing or a higher wiring density than that in the first portion 213.

The second portion 215 may serve as a connector coupling portion. For example, the second portion 215 may be bent toward a rear portion of the image display device to be electrically connected to the second circuit board 300. Accordingly, a circuit connection of the signal wirings 220 may be easily implemented by using the second portion 215 having a reduced width.

Further, a bonding stability with the first antenna device 100 may be improved by the first portion 213 having a relatively large width. If the first antenna units 120 of the first antenna device 100 are arranged in the array form, a sufficient distribution space of the signal wirings 220 may be provided from the first portion 213.

In exemplary embodiments, the first circuit board 200 and the second circuit board 300 may be electrically connected to each other through a circuit board coupling connector 250.

In some embodiments, the circuit board coupling connector 250 may be provided as a Board to Board (B2B) connector, and may include a first connector 252 and a second connector 254.

The first connector 252 may be mounted on the second portion 215 of the first circuit board 200 to be electrically connected to terminal end portions of the signal wirings 220 through a surface mount technology (SMT).

The second circuit board 300 may be, e.g., a rigid printed circuit board. For example, the second circuit board 300 may include a resin (e.g., epoxy resin) layer impregnated with an inorganic material such as glass fiber (e.g., a prepreg) as a base insulating layer or a second core layer 310. The second circuit board 300 may further include circuit wirings distributed on a surface and at an inside of the base insulating layer.

The antenna driving IC chip 330 may be mounted on the second circuit board 300. As described above, the second connector 254 may be mounted on the second circuit board 300 through, e.g., the surface mount technology (SMT). For example, the second connector 254 may be electrically connected to the antenna driving IC chip 330 through a first connection wiring 335 included in the second circuit board 300.

As indicated by an arrow in FIG. 1, the first connector 252 mounted on the first circuit board 200 and the second connector 254 mounted on the second circuit board 300 may be coupled to each other. For example, the first connector 252 may serve as a plug connector or a male connector, and the second connector 254 may serve as a receptacle connector or a female connector.

Thus, the first and second circuit boards 200 and 300 may be connected through the circuit board coupling connector 250, so that and the antenna driving IC chip 330 and the first antenna units 120 may be electrically connected to each other. Accordingly, feeding/control signals (e.g., a phase, a beam tilting signal, etc.) may be applied from the antenna driving IC chip 330 to the first antenna unit 120. Additionally, an intermediate structure of the first circuit board 200-the circuit board coupling connector 250-the second circuit board 300 may be formed.

As described above, the first and second circuit boards 200 and 300 may be electrically coupled to each other by using the circuit board coupling connector 250. Accordingly, the first and second circuit boards 200 and 300 may be easily coupled to each other using the circuit board coupling connector 250 without an additional heating or pressurizing process such as a bonding process.

Therefore, a dielectric loss due to thermal damages to a substrate and a resistance increase due to wiring damages, etc., caused by the heating and pressurization process may be suppressed and a signal loss in the first antenna unit 120 may also be prevented.

Further, the second portion 215 of the first circuit board 200 on which the first connector 252 is mounted may be bent, and the first connector 252 may be coupled to the second connector 254, so that a connection with the second circuit board 300 disposed at the rear portion of the image display device may be easily implemented.

For example, the first connector 252 and the second connector 254 may be high-frequency connectors. For example, the first connector 252 and the second connector 254 may be high-frequency connectors of 12 GHz or higher. In this case, a signal transmission between the first antenna device 100 for transmitting and receiving a signal in a high frequency or ultrahigh frequency (e.g., 3G, 4G, 5G or higher) band and the antenna driving IC chip 330 may be facilitated. Accordingly, the signal transmission/reception with high-efficiency and high-reliability may be implemented in the high-frequency or ultra-high frequency band.

A circuit element 340 may be mounted on the second circuit board 300 in addition to the antenna driving IC chip 330. The circuit element 340 may include, e.g., a capacitor such as a multi-layered ceramic capacitor (MLCC), an inductor, a resistor, or the like.

Figure 2:
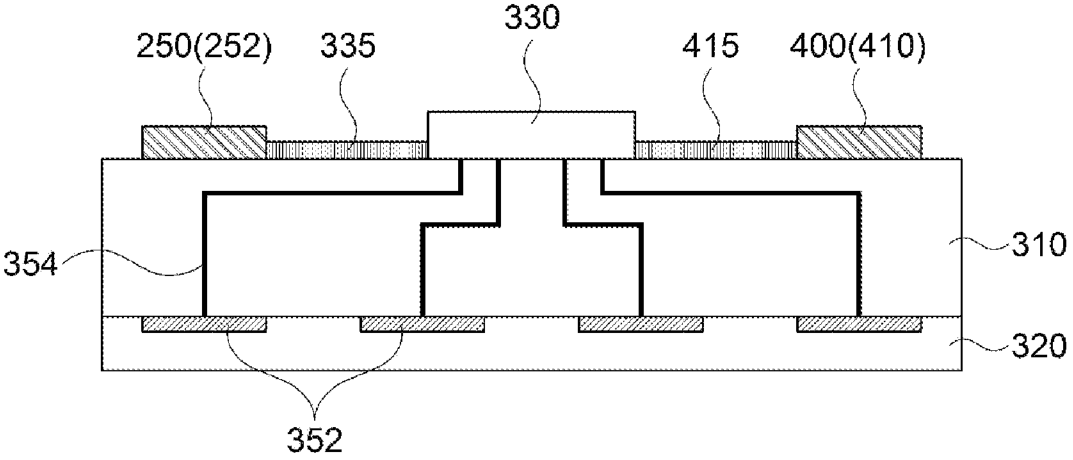
FIGS. 2 and 3 are schematic cross-sectional views illustrating a second circuit board included in an antenna package in accordance with exemplary embodiments.
Figure 3:
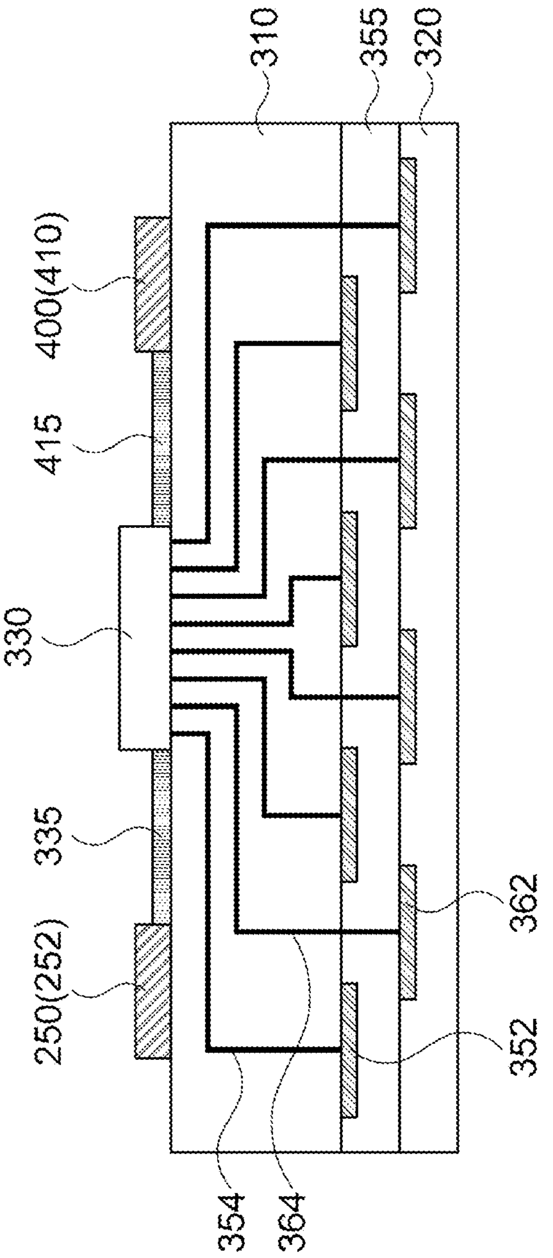

FIGS. 2 and 3 are schematic cross-sectional views illustrating a second circuit board included in an antenna package in accordance with exemplary embodiments. Specifically, FIGS. 2 and 3 are schematic cross-sectional views of the second circuit board taken along line a I-I' of FIG. 1.

Referring to FIG. 2, the second circuit board 300 may include the second core layer 310. The second antenna unit 352 may be substantially integrated with the second circuit board 300. For example, the second antenna unit 352 may be disposed on a bottom surface of the second core layer 310 or buried in the second core layer 310.

In exemplary embodiments, the second circuit board 300 may include a first via structure 354 penetrating the second core layer 310.

The second antenna unit 352 may be electrically connected to the antenna driving IC chip 330 through, e.g., the first via structure 354.

In this case, a signal transmission/reception between the second antenna unit 352 and the antenna driving IC chip 330 may be implemented through the first via structure 354 without an additional signal wiring. Accordingly, a connection distance between the second antenna unit 352 and the antenna driving IC chip 330 may be reduced, so that a signal loss may be prevented and a radiation performance may be improved.

For example, the first via structure 354 may be a structure filled in a via hole. For example, the first via structure 354 may be formed of substantially the same material as that of the second antenna unit 352.

In some embodiments, the first antenna unit 120 and the second antenna unit 352 may be electrically connected to one antenna driving IC chip 330. In this case, feeding/control signals may be applied from one antenna driving IC chip 330 to the first antenna unit 120 and the second antenna unit 352.

Thus, space efficiency of the antenna package and the image display device may be increased. Additionally, an additional antenna driving IC chip for applying a signal to the second antenna unit 352 may not be needed, and thus a signaling distance may be reduced, thereby reducing the signal loss and achieving the antenna with high reliability.

In some embodiments, a protective layer 320 may be disposed on the second antenna unit 352. The protective layer 320 may be, e.g., a coverlay film.

For example, the protective layer 320 may include substantially the same material as that of the first and second core layers 210 and 310.

Referring to FIG. 3, a third antenna unit 362 may be further disposed under the second antenna unit 352, and an insulating layer 355 may be disposed between the second antenna unit 352 and the third antenna unit 362.

For example, the second antenna unit 352 and the third antenna unit 362 may be electrically and physically separated from each other by the insulating layer 355. In this case, the above-described protective layer 320 may be formed on the third antenna unit 362.

In some embodiments, the second circuit board 300 may include a second via structure 364 penetrating the second core layer 310. The third antenna unit 362 may be electrically connected to the antenna driving IC chip 330 through, e.g., the second via structure 364.

In this case, a signal transmission/reception between the third antenna unit 362 and the antenna driving IC chip 330 may be implemented through the second via structure 364 without an additional signal wiring. Accordingly, a connection distance between the third antenna unit 362 and the antenna driving IC chip 330 may be reduced, so that the signal loss may be reduced and the radiation performance may be improved.

For example, the second via structure 364 may be a structure filled in the via hole. For example, the second via structure 364 may be formed of substantially the same material as that of the third antenna unit 362.

Further, a plurality of the second antenna units 352 and the third antenna unis 362 may be connected to one antenna driving IC chip 330 with the reduced signal loss, so that spatial efficiency, radiation performance and antenna gain of the antenna package may be improved.

For example, the second antenna unit 352 may include a second radiator, and the third antenna unit 362 may include a third radiator.

In some embodiments, the second radiator and the third radiator may have different shapes and sizes. In this case, the second antenna unit 352 and the third antenna unit 362 may have different resonance frequencies. Accordingly, the second antenna unit 352 and the third antenna unit 362 may be provided as multi-radiation or multi-band antennas radiating in a plurality of resonance frequency bands.

In some embodiments, a plurality of the second antenna units 352 and a plurality of the third antenna units 362 may form a second antenna unit column and a third antenna unit column, respectively.

For example, the second antenna unit column and the third antenna unit column may be stacked in a thickness direction. Thus, a plurality of the antenna units 352 and 362 may be disposed in a narrow space, and spatial efficiency and radiation performance of the antenna package may be further improved.

In some embodiments, the second antenna unit and the third antenna unit may not overlap each other in the thickness direction. In this case, a vertical radiation of each antenna unit may be facilitated, and deterioration of driving reliability due to a signal overlap or a signal disturbance may be prevented.

The second antenna unit 352 and the third antenna unit 362 may include, e.g., substantially the same metal, alloy or conductive oxide as those of the above-described first antenna unit 120. The second radiator and the third radiator may have, e.g., a polygonal plate shape.

For example, the second antenna unit 352 and the third antenna unit 362 may include a solid metal pattern in consideration of, e.g., a low resistance to improve radiation performance and signal efficiency.

Figure 4:
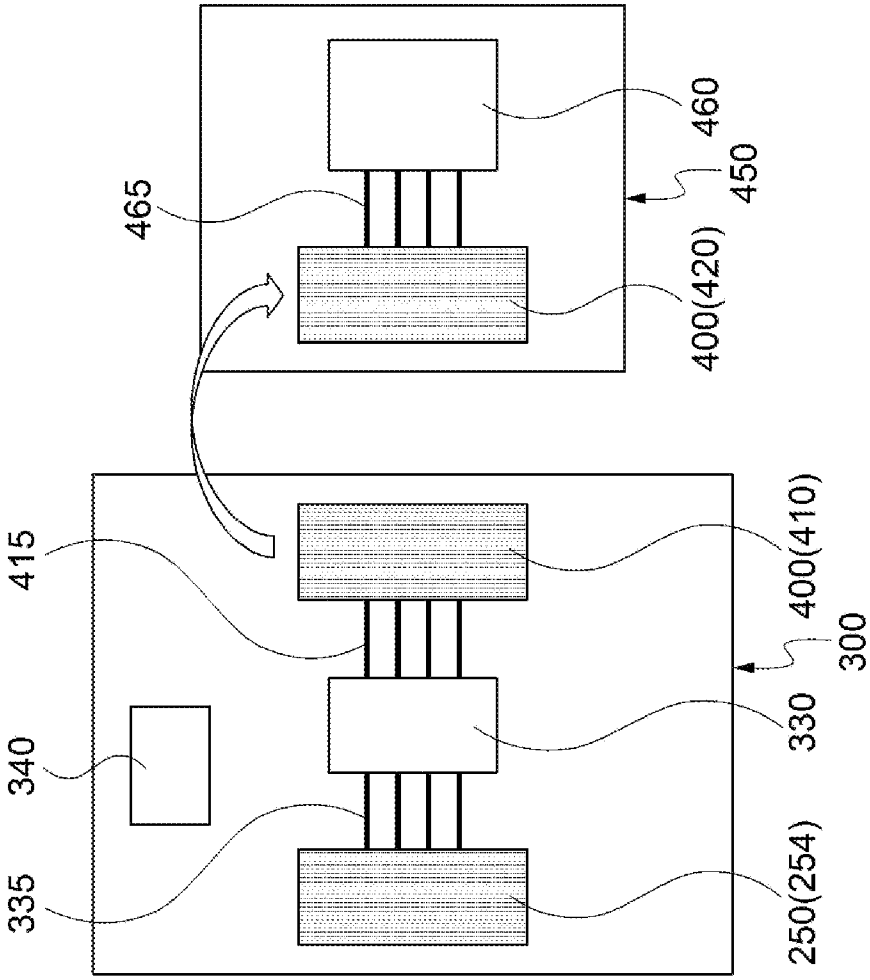
FIG. 4 is a schematic top planar view illustrating a connection between an antenna package and an image display device in accordance with exemplary embodiments.

FIG. 4 is a schematic top planar view illustrating a connection between an antenna package and an image display device in accordance with exemplary embodiments.

Referring to FIG. 4, the above-described second circuit board 300 may be electrically connected to a main board 450 of the image display device through a main board coupling connector 400. For example, the main board 450 may include a core layer formed of substantially the same material as that of the first core layer 210 of the first circuit board 200 as described above.

In some embodiments, the main board coupling connector 400 may be provided as a B2B connector, and may include a third connector 410 and a fourth connector 420

In some embodiments, the third connector 410 may be mounted on the second circuit board 300 by, e.g., an SMT. For example, the third connector 410 may be electrically connected to the antenna driving IC chip 330 through the second connection wiring 415 included in the second circuit board 300.

In some embodiments, the fourth connector 420 may be mounted on the main board 450 of the image display device by, e.g., an SMT. For example, the fourth connector 420 may be electrically connected to a control unit 460 (e.g., an application processor (AP)) mounted on the main board 450 through a third connection wiring 465 included in the main board 450.

As indicated by an arrow in FIG. 4, the third connector 410 mounted on the second circuit board 300 and the fourth connector 420 mounted on the main board 450 may be coupled to each other. For example, the third connector 410 may be provided as a plug connector or a male connector, and the fourth connector 420 may be provided as a receptacle connector or a female connector.

Accordingly, the connection of the second circuit board 300 and the main board 450 may be implemented through the main board coupling connector 400, and an electrical connection of the antenna driving IC chip 330 and the control unit 460 may be implemented. Thus, feeding/control signals may be applied from the control unit 460 to the first antenna unit 120, the second antenna unit 352 and/or the third antenna unit 362 through the antenna driving IC chip 330. Additionally, an intermediate structure of the second circuit board 300-the main board coupling connector 400-the main board 450 may be formed.

As described above, the second circuit board 300 and the main board 450 may be electrically coupled to each other using the main board coupling connector 400. Thus, the second circuit board 300 and the main board 450 may be easily coupled to each other using the main board coupling connector 250 without an additional heating or pressurizing process such as a bonding process.

Therefore, a dielectric loss due to thermal damages to a substrate and a resistance increase due to wiring damages, etc., caused by the heating and pressurizing process may be suppressed and a signal loss between the control unit 460 and the antenna driving IC chip 330 may also be prevented.

In some embodiments, the third connector 410 and the fourth connector 420 may be low-frequency connectors. For example, the third connector 410 and the fourth connector 420 may be low-frequency connectors of 10 GHz or less.

For example, the above-described antenna driving IC chip 330 may convert a high frequency or ultra-high frequency (e.g., 12 GHz or more) signal into a low frequency (e.g., 10 GHz or less) signal. For example, the converted low-frequency signal may be transmitted to the third connector 410 through the second connection wiring 415.

For example, the low-frequency signal may be transmitted to the control unit 460 of the image display device through the fourth connector 420 coupled to the third connector 410. Accordingly, a long-wavelength signal may be stably transmitted to the control unit 460 while also implementing a signaling in the high-frequency or ultra-high frequency band.

Figure 5:
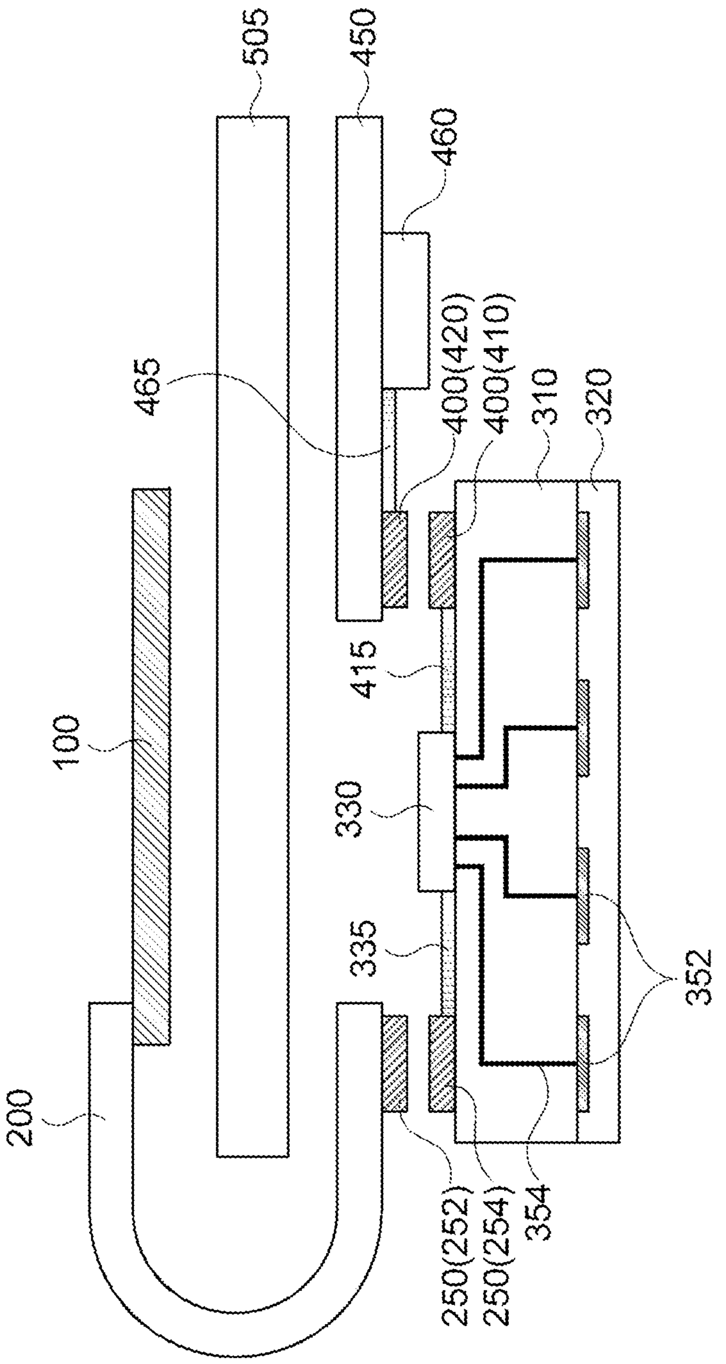
FIGS. 5 and 6 are a schematic cross-sectional view and a schematic top planar view, respectively, illustrating an image display device in accordance with exemplary embodiments.
Figure 6:
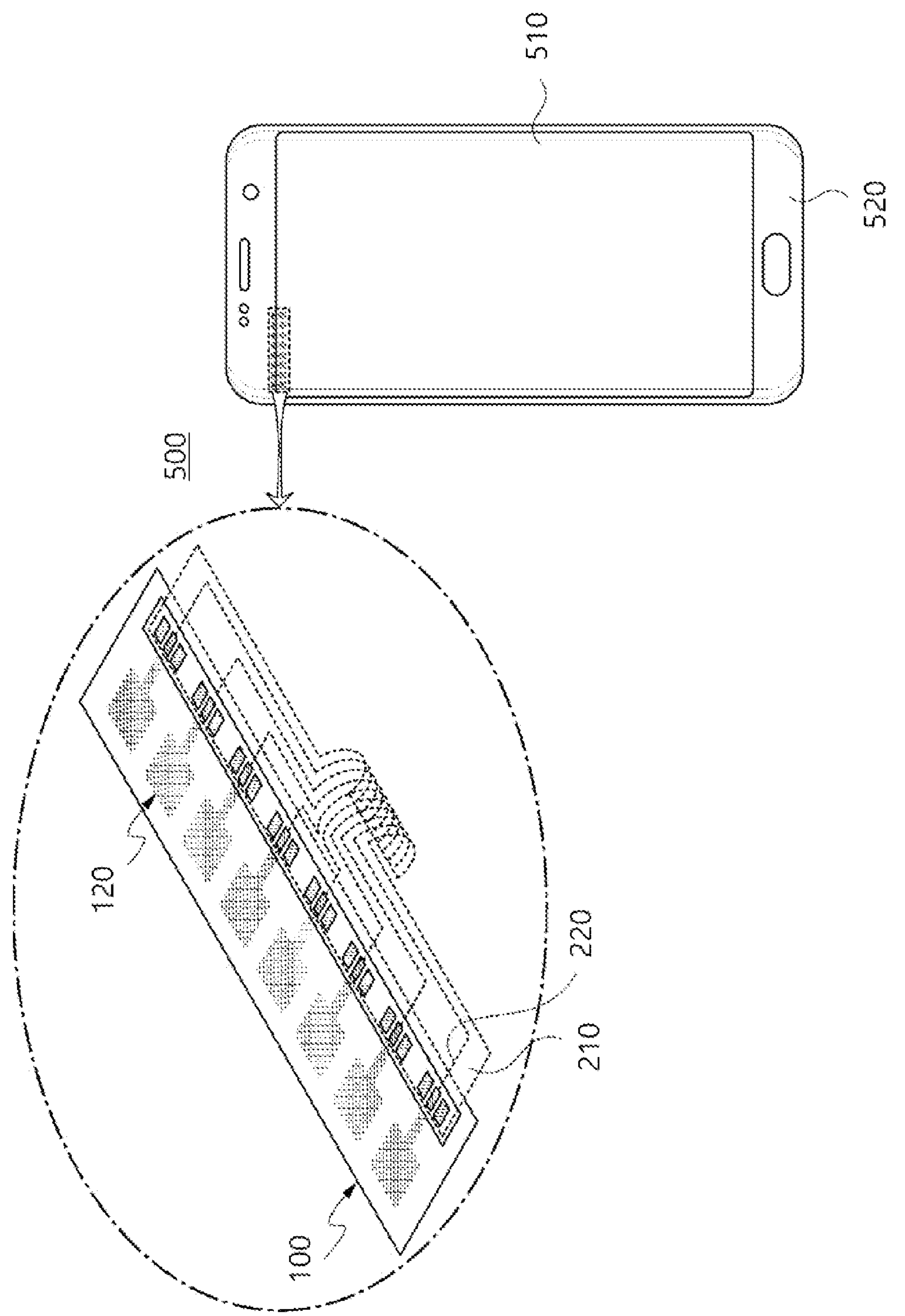

FIGS. 5 and 6 are a schematic cross-sectional view and a schematic top planar view, respectively, illustrating an image display device in accordance with exemplary embodiments.

Referring to FIGS. 5 and 6, an image display device 500 may be fabricated in the form of, e.g., a smart phone, and FIG. 6 illustrates a front portion or a window surface of the image display device 500. The front portion of the image display device 500 may include a display area 510 and a peripheral area 520. The peripheral area 520 may correspond to, e.g., a light-shielding portion or a bezel portion of the image display device.

In FIG. 6, the second antenna unit 352 and the second circuit board 300 are omitted for convenience of explanation.

The first antenna unit 120 included in the above-described antenna package may be disposed toward the front portion of the image display device 500, and may be disposed on, e.g., a display panel 505. In an embodiment, the first radiators 122 may be at least partially disposed in the display area 510.

In this case, the first radiator 122 may include a mesh-pattern structure to prevent a reduction of transmittance due to the first radiator 122. The pads 126 and 128 included in the first antenna unit 120 may be formed as a solid metal pattern, and may be disposed in the peripheral area 520 to prevent deterioration of an image quality In some embodiments, the first circuit board 200 may be bent by, e.g., the second portion 215 and disposed on a rear portion of the image display device 500 to extend to the second circuit board on which the antenna driving IC chip 330 is mounted.

The first circuit board 200 and the second circuit board 300 may be interconnected through the circuit board coupling connector 250, so that feeding and antenna driving control of the first antenna device 100 may be performed by the antenna driving IC chip 330.

In exemplary embodiments, the first antenna unit 120 may be disposed on the front portion of the display panel 505 and may serve as, e.g., an AoD (Antenna on Display).

In example embodiments, the second antenna unit 352 and the second circuit board 300 may be disposed on a lateral portion or the rear portion of the display panel 505 to serve as, e.g., an AiP (Antenna in Package).

Accordingly, a multi-axis directional transmission/reception may be implemented in one antenna package and an enhanced beam coverage may be obtained.

As described above, the antenna units may be disposed on the front, lateral side or rear portion of the image display device, so that radiation coverage of the antenna unit may be expanded. Accordingly, higher radiation sensitivity and signal sensitivity may be achieved while prevent a narrowing band phenomenon occurring in the high-frequency or ultra-high-frequency communication.

Further, the number of the antenna units may be increased in the lateral or rear portion that may not be visible to a user, so that antenna driving properties may be enhanced without degrading the image quality of the image display device.

What is claimed is:

1. An image display device, comprising:
- a display panel;
- an antenna package disposed on the display panel;
- a main board disposed under the display panel; and
- a control unit mounted on the main board,
- the antenna package comprising:
  - a first antenna device comprising a first antenna unit;
  - a first circuit board electrically connected to the first antenna unit;
  - a second circuit board electrically connected to the first circuit board;
  - a second antenna unit integrated with the second circuit board;
  - a third antenna unit disposed under the second antenna unit;
  - an insulating layer disposed between the second antenna unit and the third antenna unit; and
  - an antenna driving integrated circuit chip mounted on the second circuit board and electrically connected to the first antenna unit and the second antenna unit,
- wherein the antenna package is bent under the display panel to be electrically connected to the control unit.

2. The image display device of claim 1, further comprising:
- a first connector mounted on the first circuit board and electrically connected to the first antenna unit; and
- a second connector mounted on the second circuit board and coupled to the first connector.

3. The image display device of claim 2, wherein the second circuit board further comprises a first connection wiring, and the second connector is electrically connected to the antenna driving integrated circuit chip through the first connection wiring.

4. The image display device of claim 2, wherein the first connector and the second connector are high-frequency connectors.

5. The image display device of claim 2, wherein the first antenna unit comprises a plurality of first antenna units disposed in an array form; and the first circuit board comprises a plurality of signal wirings independently bonded to each of the plurality of first antenna units and electrically connected to the first connector.

6. The image display device of claim 5, wherein the first antenna device further comprises an antenna dielectric layer on which the first antenna units are arranged; and each of the first antenna units includes a first radiator, a transmission line extending from the radiator and a signal pad connected to a terminal end portion of the transmission line and bonded to each of the signal wirings.

7. The image display device of claim 6, wherein the second circuit board of the antenna package comprises a second connection wiring, and the antenna package further comprises a third connector mounted on the second circuit board and electrically connected to the antenna driving integrated circuit chip through the second connection wiring.

8. The image display device of claim 7, further comprising a fourth connector mounted on the main board to be coupled to the third connector, wherein the main board further comprises a third connection wiring for electrically connecting the control unit and the fourth connector to each other.

9. The image display device of claim 8, wherein the third connector and the fourth connector are low-frequency connectors.

10. The image display device of claim 1, wherein the second circuit board comprises a second core layer and a first via structure penetrating the second core layer; and the second antenna unit is disposed on a bottom surface of the second core layer and is electrically connected to the antenna driving integrated circuit chip through the first via structure.

11. The image display device of claim 1, wherein the second circuit board comprises a second via structure penetrating the second core layer and the insulating layer; and the third antenna unit is electrically connected to the antenna driving integrated circuit chip through the second via structure.

12. The image display device of claim 1, wherein the first circuit board is a flexible printed circuit board and the second circuit board is a rigid printed circuit board.

13. An image display device comprising:

a display panel;

an antenna package disposed on the display panel;

a main board disposed under the display panel; and a control unit mounted on the main board, the antenna package comprising:

a first antenna device comprising a first antenna unit;

a first circuit board electrically connected to the first antenna unit;

a second circuit board electrically connected to the first circuit board;

a second antenna unit integrated with the second circuit board;

a first connector mounted on the first circuit board and electrically connected to the first antenna unit;

a second connector mounted on the second circuit board and coupled to the first connector; and an antenna driving integrated circuit chip mounted on the second circuit board and electrically connected to the first antenna unit and the second antenna unit, wherein the first circuit board has a first portion bonded to the first antenna unit and a second portion having a smaller width than that of the first portion, and the first connector is mounted on the second portion, wherein the antenna package is bent under the display panel to be electrically connected to the control unit.

14. The image display device of claim 13, wherein the second portion of the first circuit board is bent to couple the first connector and the second connector to each other.

* * * * *